Feb. 28, 1939.  M. E. COLLINS  2,148,605
PHOTOGRAPHIC RECORDING OF SOUND
Filed July 23, 1935   3 Sheets-Sheet 1
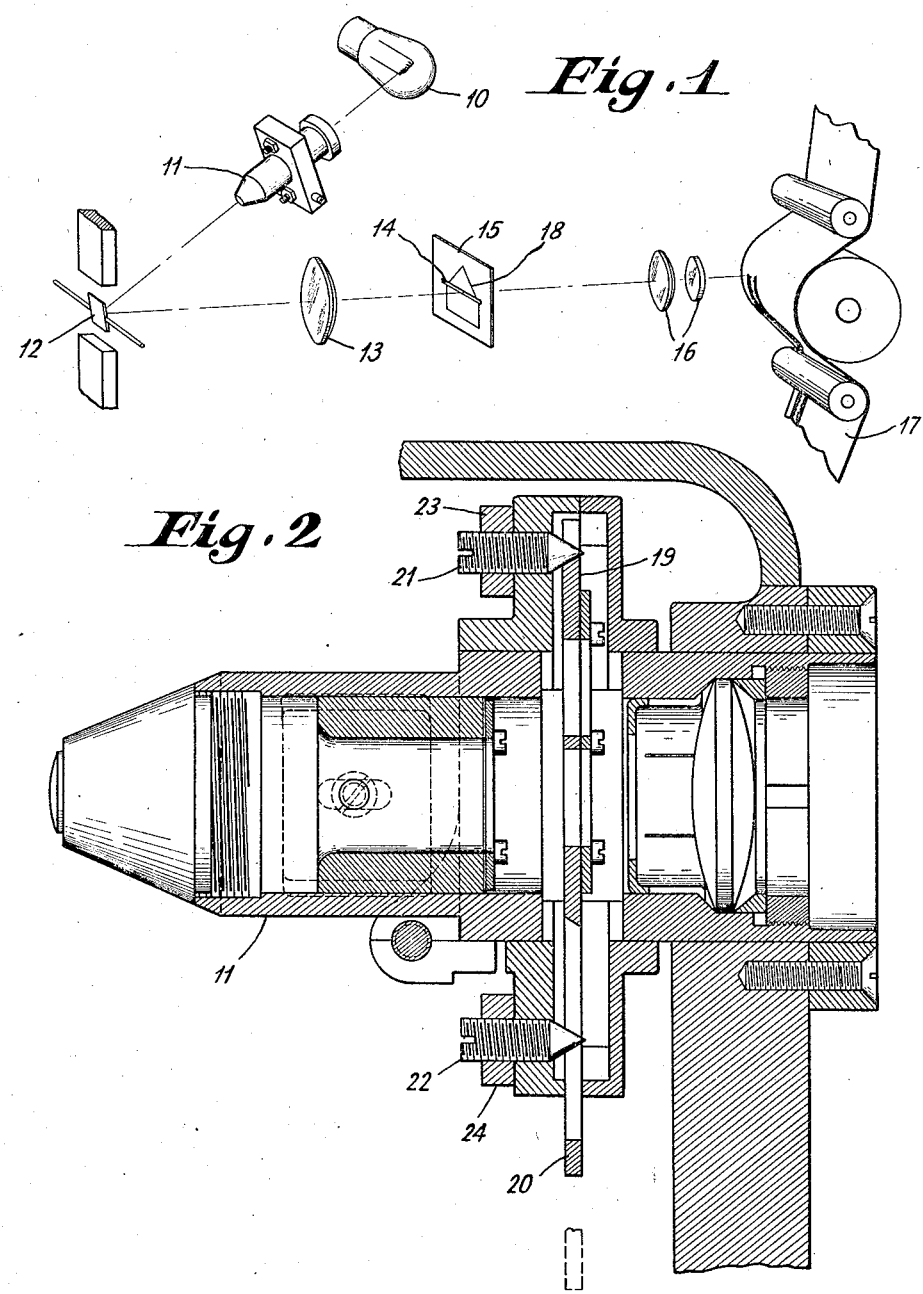
INVENTOR
MILFORD E. COLLINS
BY
ATTORNEY

INVENTOR
MILFORD E. COLLINS
BY
ATTORNEY

Feb. 28, 1939. M. E. COLLINS 2,148,605
PHOTOGRAPHIC RECORDING OF SOUND
Filed July 23, 1935 3 Sheets-Sheet 3
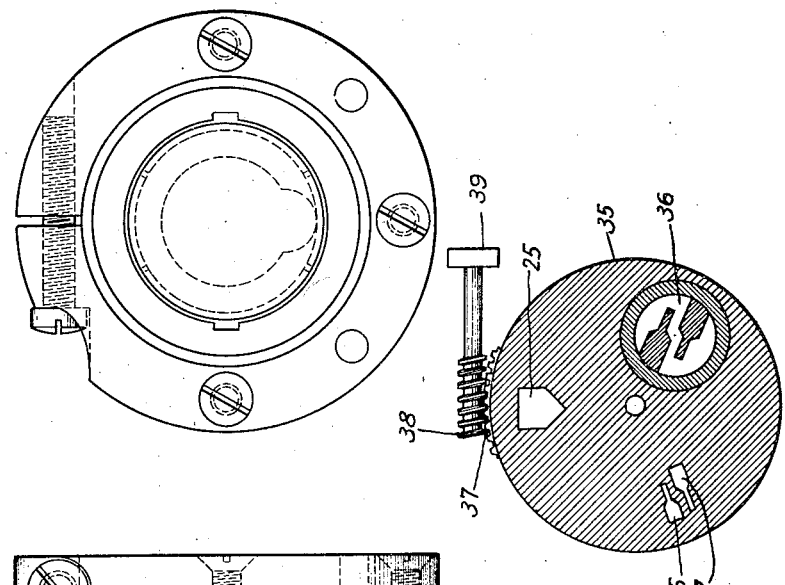
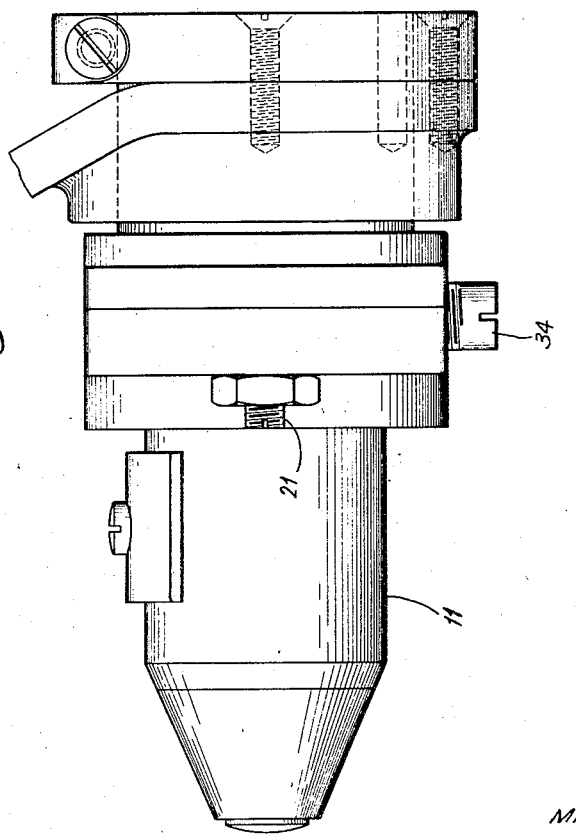
INVENTOR
MILFORD E. COLLINS
BY
ATTORNEY Patented Feb. 28, 1939

2,148,605

UNITED STATES PATENT OFFICE 2,148,605

PHOTOGRAPHIC RECORDING OF SOUND

Milford E. Collins, Collingswood, N. J., assignor to Radio Corporation of America, a corporation of Delaware Application July 23, 1935, Serial No. 32,731

9 Claims. (Cl. 179—100.3)

This invention relates to the photographic recording of sound, and has for its principal object the provision of an improved apparatus and method of operation for producing sound records of different types such as those having the positive and negative half cycles recorded on a single track, those having the alternate half cycles recorded on separate tracks or the like.

It is well known that the type of sound record produced by a photographic recorder is dependent on the form of light beam varied or modulated in accordance with the sound to be recorded. Thus in one type of single track recording, a triangularly-shaped light beam is vibrated transversely of a light slit and, in the case of push-pull recording, a pair of triangularly-shaped beams having their vertices pointed in opposite directions are likewise vibrated transversely of a light slit.

It is desirable in practice to be able to produce these various types of records by means of a single apparatus which is readily adjusted to produce the required type of record. In accordance with the present invention this result is achieved by means including a member provided with a variety of apertures and so mounted as to permit any one of these apertures to be readily brought into alinement with the optical system of the apparatus.

The invention will be better understood from the following description when considered in connection with the accompanying drawings, and its scope will be delineated in the appended claims.

Referring to the drawings:

Fig. 1 is a diagrammatic illustration of a recording apparatus constructed in accordance with the invention.

Fig. 2 is a sectional view of a part of the optical system of the recorder shown in Fig. 1.

Figs. 7 and 8 are respectively top and end views of the device of Fig. 2, and

Fig. 9 illustrates a modification of the invention.

Figure 3:
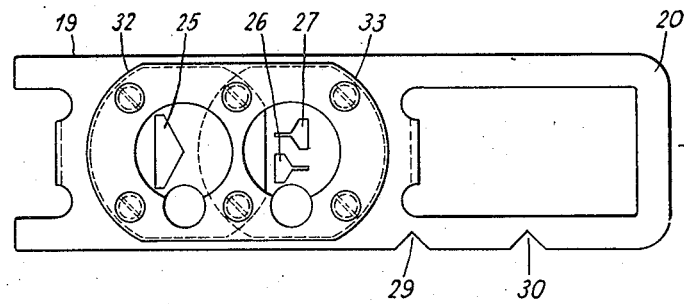
Figs. 3 to 6 illustrate various constructional features of the device of Fig. 2.

The recording apparatus of Fig. 1 includes a lamp 10 from which light passes through means including an optical barrel 11 to the vibratable mirror 12 of a recording galvanometer. From the mirror 12 light is reflected through a lens 13, the light slit 14 of a screen 15, and lenses 16 to the surface of a record 17. The image of the light beam reflected from the mirror 11 to the screen 15 is indicated at 18. Aside from the optical barrel 11 this recording apparatus is of a well known form.

Figure 4:
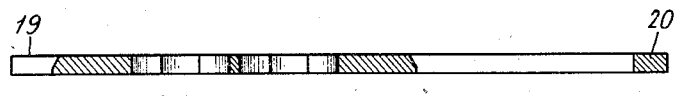
Figure 5:
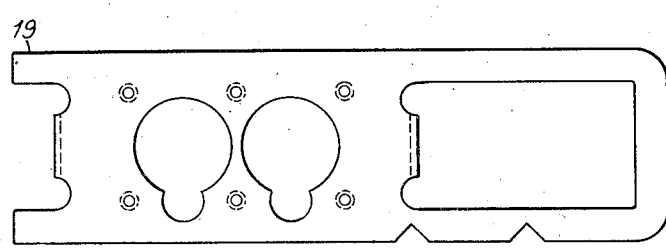
Figure 6:
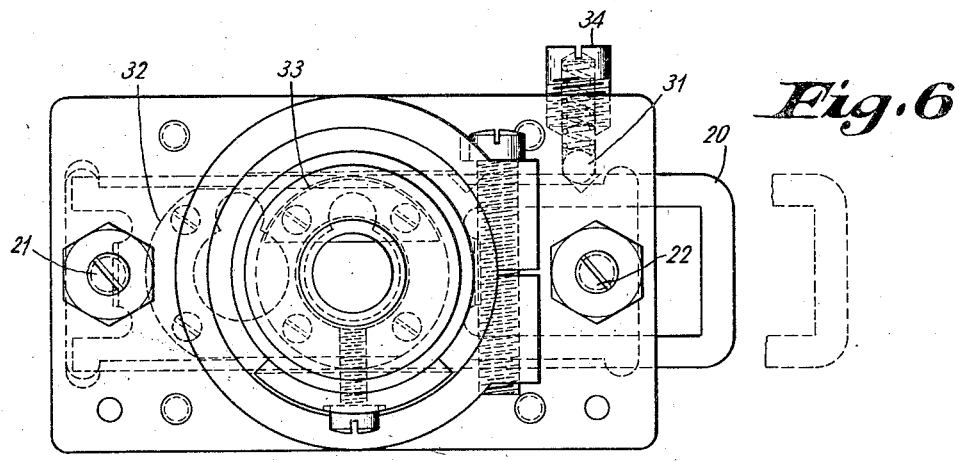

With the type of image 18, sound is recorded in the form of a single track, both edges of which vary in accordance with the sound to be recorded. In order to permit the recording of sound tracks of different types, the optical barrel 11 is provided with an aperture plate 19 (Figs. 2 to 6) which is movable to produce differently shaped images at the screen 15. This aperture plate is provided with a handle 20 which may be moved to the position illustrated by dotted lines to bring one or another of the apertures into registry with the optical axis of the recorder. Either of the adjusted positions of the aperture plate is definitely fixed by a tapered screw 21 or 22 provided with a lock-nut 23 or 24 for fixing the screw in its adjusted position.

As will be more clearly seen from Figs. 3 to 6, the aperture plate 19 is provided with means forming a triangular aperture 25 and with means forming a pair of triangular apertures 26 and 27 which have their vertices pointed in opposite directions. At the lefthand edge of the plate 19 are provided a pair of notches 29 and 30 which cooperate with a spring-pressed ball 31 (Fig. 6) for holding the plate in its adjusted position. It will be noted that the apertures 25 to 27 are formed in disc-like plates 32 and 33 which are clamped against the plate 19 by means of screws, and that a screw 34 is provided for adjusting the pressure exerted on the ball 31 by the spring. Top and end views of the barrel 17 are shown in Figs. 7 and 8.

Instead of the adjustable aperture plate 19 there may be provided a rotatable aperture plate 35 (Fig. 9). This plate is provided with apertures 25, 26, and 27 corresponding to the apertures of the plate 19, and with an additional aperture 36 which is the reverse of the apertures 26 and 27, and operates to produce a negative record similar to the positive record of apertures 26 and 27. Any suitable means such as a gear 37 mounted on the ends of the plate and a worm 38 operated by a thumb-screw 39 may be provided for bringing these various apertures into registry with the optical axis.

I claim:

1. A sound recorder including means operable to modulate a light beam in accordance with the sound to be recorded, and means operable to cause said beam to assume one form for recording said sound either on a single track or to assume another form for recording said sound on tracks which are spaced from one another and correspond respectively to the positive and negative half cycles of the sound wave.

2. A sound recorder including means operable to modulate a light beam in accordance with the sound to be recorded, means including an adjustable member provided with a plurality of apertures, and means operable to cause said sound to be recorded either on a single track or on tracks which are spaced from one another and correspond respectively to the positive and negative half cycles of the sound wave.

3. A sound recorder including means operable to modulate a light beam in accordance with the sound to be recorded, means including a slidable plate provided with a plurality of apertures for causing said sound to be recorded either on a single track or on tracks which are spaced from one another and correspond respectively to the positive and negative half cycles of the sound wave.

4. A sound recorder including means operable to modulate a light beam in accordance with the sound to be recorded, means including a rotatable plate provided with a plurality of apertures, and means operable to cause said sound to be recorded either on a single track or on tracks which are spaced from one another and correspond respectively to the positive and negative half cycles of the sound wave.

5. A sound recorder including means operable to modulate a light beam in accordance with the sound to be recorded, a member provided with a plurality of apertures and adjustable to different positions for determining the form in which said sound is recorded, and adjustable means for predetermining the adjusted positions of said member.

6. A sound recorder including means operable to modulate a light beam in accordance with the sound to be recorded, a member provided with a plurality of apertures and adjustable to different positions for determining the form in which said sound is recorded, adjustable means for predetermining the adjusted positions of said member, and means for maintaining said member in any of said positions.

7. An aperture plate for sound recording comprising a support member, members on said support having different apertures adapted to be selectively used in sound recording and means on said supporting member for definitely positioning the selected one of said apertures.

8. An aperture plate for sound recording comprising a support member, members on said support having different apertures adapted to be selectively used in sound recording for producing either positive or negative records in the original recording, and means on said supporting member for definitely positioning the selected one of said apertures.

9. An aperture plate for sound recording comprising a support member, members on said support having different apertures adapted to be selectively used in sound recording for producing either positive or negative push pull records in the original recording, and means on said supporting member for definitely positioning the selected one of said apertures.

MILFORD E. COLLINS.